(12) United States Patent
Jacob

(10) Patent No.: US 12,316,546 B1
(45) Date of Patent: May 27, 2025

(54) DYNAMICALLY PROGRAMMING CLASS OF SERVICE CONFIGURATIONS FOR NETWORK DEVICES

(71) Applicant: Juniper Networks, Inc., Sunnyvale, CA (US)

(72) Inventor: Sudhin Jacob, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 54 days.

(21) Appl. No.: 18/343,010

(22) Filed: Jun. 28, 2023

(51) Int. Cl.
*G06F 15/173* (2006.01)
*H04L 41/5009* (2022.01)
*H04L 47/2425* (2022.01)

(52) U.S. Cl.
CPC ...... *H04L 47/2425* (2013.01); *H04L 41/5009* (2013.01)

(58) Field of Classification Search
CPC .............. H04L 47/2425; H04L 41/5009
USPC ........................................... 709/238
See application file for complete search history.

(56) References Cited

U.S. PATENT DOCUMENTS

| | | | |
|---|---|---|---|
| 6,876,667 B1 | 4/2005 | Synnestvedt et al. | |
| 7,675,916 B2 | 3/2010 | Kempe | |
| 8,775,352 B2 | 7/2014 | Sen et al. | |
| 9,331,914 B2 | 5/2016 | Thyni et al. | |
| 11,388,073 B1* | 7/2022 | Chraim | H04L 43/045 |
| 2002/0087699 A1 | 7/2002 | Karagiannis et al. | |
| 2011/0179455 A1 | 7/2011 | Thompson | |
| 2016/0094412 A1* | 3/2016 | Fichou | H04L 43/16 709/224 |
| 2020/0228626 A1* | 7/2020 | Bernat | H04L 47/83 |
| 2021/0117249 A1* | 4/2021 | Doshi | H04L 67/1001 |
| 2021/0235313 A1* | 7/2021 | Devadoss | H04L 49/555 |
| 2023/0121880 A1* | 4/2023 | Yavuz | H04L 41/5009 370/329 |
| 2023/0273597 A1* | 8/2023 | Guim Bernat | G05B 19/416 |
| 2024/0340231 A1* | 10/2024 | Halappa | H04L 12/4633 |

OTHER PUBLICATIONS

"Broadband Subscriber Services User Guide," Website: https://www.juniper.net/documentation/us/en/software/junos/subscriber-mgmt-services/topics/ref/statement/interfaces-edit-dynamic-profiles-cos.html, Published Jun. 14, 2023, 1801 Pages.

(Continued)

*Primary Examiner* — Alan S Chou
(74) *Attorney, Agent, or Firm* — Harrity & Harrity, LLP

(57) ABSTRACT

A device may provide a class of service configuration to a plurality of network devices of a network serving a plurality of user devices, and may identify a set of network devices, of the plurality of network devices, that are subject to a modified class of service. The device may receive telemetry data associated with the plurality of the network devices, and may determine whether the telemetry data satisfies a threshold. The device may selectively maintain the class of service configuration for the plurality of network devices based on the telemetry data failing to satisfy the threshold, or modify the class of service configuration to cause the set of network devices to provide the modified class of service for a set of user devices based on the telemetry data satisfying the threshold.

20 Claims, 11 Drawing Sheets

(56) References Cited

OTHER PUBLICATIONS

Bahnasse et al., "A Policy Based Management of a Smart Adaptive QoS for the Dynamic and Multipoint Virtual Private Network," International Journal of Control and Automation, vol. 9, No. 5 (2016), 14 Pages.

Bojovic et al., "Dynamic QoS Management for a Flexible 5G/6G Network Core: A Step toward a Higher Programmability," Sensors 2022, vol. 22, 23 Pages.

"Automating Dynamic QoS Management with Juniper Extension Toolkit," Website: https://www.juniper.net/content/dam/www/assets/white-papers/us/en/automating-dynamic-qos-management-with-juniper-extension-toolkit.pdf, 2016, 6 Pages.

Ahmed et al., "A Measurement-Based Approach for Dynamic QoS Adaptation in DiffServ Networks," Computer Communications, vol. 28, Issue 18, Nov. 1, 2005, 20 Pages.

"5G QoS for IndustrialAutomation," Website: https://5g-acia.org/whitepapers/5g-quality-of-service-for-industrial-automation-2/, 2023, 8 Pages.

Keshav et al., "Dynamic QoS Management for Interactive Multimedia in Integrated 4G/5G Networks," EAI Endorsed Transactions on Mobile Communications and Applications, vol. 6, Issue 19, e2, 2021, 13 Pages.

Cichocki et al., "Dynamic End-To-End QoS Management for Advanced RF Telemetry Networks," Air Force Flight Test Center Edwards Air Force Base, California Air Force Materiel Command United States Air Force, Jun. 9, 2011, 12 Pages.

Cichocki et al., "Dynamic End-to-End QoS Management for Advanced RF Telemetry Networks," International Telemetering Conference Proceedings, 2011, 11 Pages.

Nikolay Milovanov, "From Static to Dynamic QOS," Obtained May 8, 2023, 11 Pages.

Peros et al., "Dynamic QoS support for IoT backhaul networks through SDN," 2018 Third International Conference on Fog and Mobile Edge Computing (FMEC), 6 Pages.

\* cited by examiner

DYNAMICALLY PROGRAMMING CLASS OF SERVICE CONFIGURATIONS FOR NETWORK DEVICES

BACKGROUND

A network, such as telecommunications network, may include multiple network devices that provide network services to multiple user devices.

SUMMARY

Some implementations described herein relate to a method. The method may include providing a class of service configuration to a plurality of network devices of a network serving a plurality of user devices, and identifying a set of network devices, of the plurality of network devices, that are subject to a modified class of service. The method may include receiving telemetry data associated with the plurality of the network devices, and determining whether the telemetry data satisfies a threshold. The method may include selectively maintaining the class of service configuration for the plurality of network devices based on the telemetry data failing to satisfy the threshold, or modifying the class of service configuration to cause the set of network devices to provide the modified class of service for a set of user devices based on the telemetry data satisfying the threshold.

Some implementations described herein relate to a device. The device may include one or more memories and one or more processors. The one or more processors may be configured to provide a class of service configuration to a plurality of network devices of a network serving a plurality of user devices, and identify a set of network devices, of the plurality of network devices, that are subject to a modified class of service. The one or more processors may be configured to receive telemetry data associated with the plurality of the network devices, wherein the telemetry data includes data identifying real-time or near-real-time utilization of the plurality of network devices. The one or more processors may be configured to determine whether the telemetry data satisfies a threshold. The one or more processors may be configured to selectively maintain the class of service configuration for the plurality of network devices based on the telemetry data failing to satisfy the threshold, or modify the class of service configuration to cause the set of network devices to provide the modified class of service for a set of user devices based on the telemetry data satisfying the threshold.

Some implementations described herein relate to a non-transitory computer-readable medium that stores a set of instructions. The set of instructions, when executed by one or more processors of a device, may cause the device to provide a class of service configuration to a plurality of network devices of a network serving a plurality of user devices, and identify a set of network devices, of the plurality of network devices, that are subject to a modified class of service. The set of instructions, when executed by one or more processors of the device, may cause the device to receive telemetry data associated with the plurality of the network devices, wherein the telemetry data includes data identifying real-time or near-real-time network bandwidth utilization by the plurality of user devices. The set of instructions, when executed by one or more processors of the device, may cause the device to determine whether the telemetry data satisfies a threshold. The set of instructions, when executed by one or more processors of the device, may cause the device to selectively maintain the class of service configuration for the plurality of network devices based on the telemetry data failing to satisfy the threshold, or modify the class of service configuration to cause the set of network devices to provide the modified class of service for a set of user devices based on the telemetry data satisfying the threshold.

DETAILED DESCRIPTION

Figure 1A:
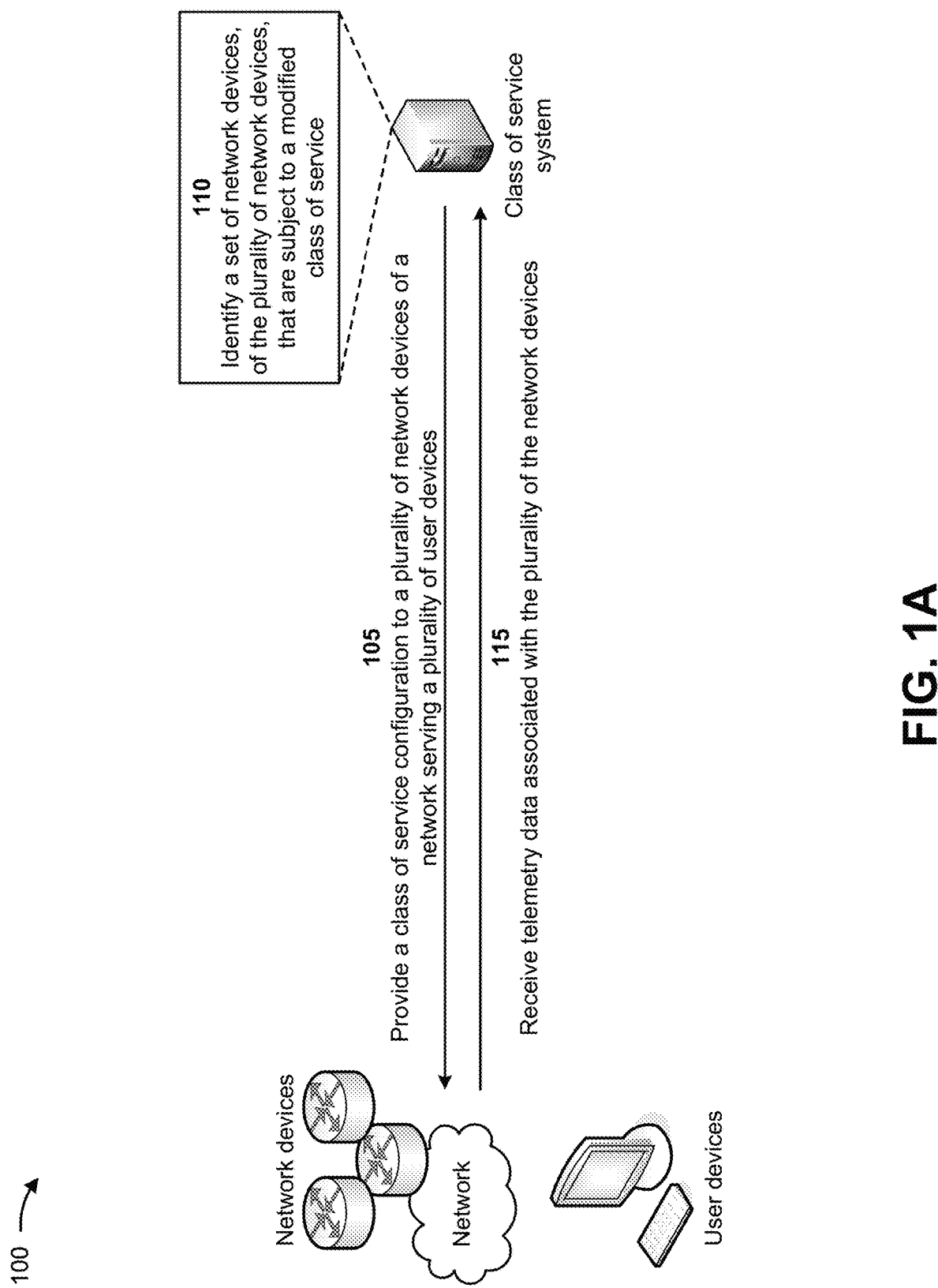
FIGS. 1A-1G are diagrams of an example associated with dynamically programming class of service configurations for network devices.

The following detailed description of example implementations refers to the accompanying drawings. The same reference numbers in different drawings may identify the same or similar elements.

Class of service (CoS) is a way of managing traffic in a network by grouping similar types of traffic (e.g., email, streaming video, voice over Internet protocol (IP), large document file transfer, and/or the like) together and treating each type as a class with its own level of network service priority. Network devices include hard-coded configurations for providing network services to end customers (e.g., user devices). However, the network devices are unable to provide a class of service to user devices that may dynamically change based on network conditions (e.g., an increase in network usage, a bandwidth shortage, and/or the like). Currently, class of service is manually configured for various service level agreements (SLAs) in network devices. Cumbersome and time-consuming manual intervention is required to change the class of service in network devices. Thus, current techniques for managing class of service for network devices consume computing resources (e.g., processing resources, memory resources, communication resources, and/or the like), networking resources, and/or other resources associated with manually changing class of service in network devices, providing a poor user experience until the class of service is changed in network devices, handling lost data caused by failing to quickly change the class of service in network devices, and/or the like.

Some implementations described herein relate to a class of service system that dynamically programs class of service configurations for network devices. For example, the class of service system may provide a class of service configuration to a plurality of network devices of a network serving a plurality of user devices, and may identify a set of network devices, of the plurality of network devices, that are subject to a modified class of service. The class of service system may receive telemetry data associated with the plurality of the network devices, and may determine whether the telemetry data satisfies a threshold. The class of service system may selectively maintain the class of service configuration for the plurality of network devices based on the telemetry data failing to satisfy the threshold, or modify the class of service configuration to cause the set of network devices to provide the modified class of service for a set of user devices based on the telemetry data satisfying the threshold.

In this way, the class of service system dynamically programs class of service configurations for network devices. For example, the class of service system may dynamically modify class of service configurations for network devices to handle network events (e.g., a usage spike, a bandwidth shortage, and/or the like), and may revert the class of service configurations to original configurations once the network events have ceased. The class of service system may utilize telemetry data from the network devices when determining whether to modify class of service configurations for the network devices. The telemetry data may provide the class of service system with network intelligence that the class of service system may utilize to automatically modify the class of service configurations for the network devices without causing a network outage. Thus, the class of service system may conserve computing resources, networking resources, and/or other resources that would have otherwise been consumed by manually changing class of service in network devices, providing a poor user experience until the class of service is changed in network devices, handling lost data caused by failing to quickly change the class of service in network devices, and/or the like.

FIGS. 1A-1G are diagrams of an example 100 associated with dynamically programming class of service configurations for network devices. As shown in FIGS. 1A-1G, example 100 includes a class of service system associated with user devices and a network of network devices. The class of service system may include a system that dynamically programs class of service configurations for network devices. The user devices may include a wireless communication device, a mobile phone, a user equipment, a laptop computer, a tablet computer, a desktop computer, and/or the like. The network may include a cellular network, such as a fifth generation (5G) network, a fourth generation (4G) network, a long-term evolution (LTE) network, a third generation (3G) network, a code division multiple access (CDMA) network, and/or the like. The network device may include a router, a gateway, a base station, and/or the like. Further details of the class of service system, the user devices, the network, and the network devices are provided elsewhere herein.

As shown in FIG. 1A, and by reference number 105, the class of service system may provide a class of service configuration to a plurality of network devices of a network serving a plurality of user devices. For example, the class of service system may define a base class of service configuration to be utilized during normal operation of the network and the plurality of network devices. The base class of service configuration may include information that configures the plurality of network devices to perform operations that provide services to the plurality of user devices. For example, the plurality of network devices may be configured to provide a video service, a gaming service, a telecommunications service, and/or the like to the plurality of user devices. The base class of service configuration may also include information that causes the plurality of network devices to generate telemetry data for monitoring live utilization of the network by the plurality of user devices. The class of service system may provide the class of service configuration to the plurality of network devices, and the plurality of network devices may be configured based on the class of service configuration. In some implementations, when providing the class of service configuration to the plurality of network devices, the class of service system may utilize an OpenConfig protocol or a network configuration protocol to provide the class of service configuration to the plurality of network devices.

As further shown in FIG. 1A, and by reference number 110, the class of service system may identify a set of network devices, of the plurality of network devices, that are subject to a modified class of service. For example, a set of user devices, of the plurality of user devices, may be subject to a modified class of service. The modified class of service for the set of user devices may include, for example, a service that redirects low priority traffic associated with the set of user devices, a service that provides a best effort service for the set of user devices, a service that provides a priority service for the plurality of user devices other than the set of user devices, a service that provides the priority service for the set of user devices, a service that provides variable billing for bandwidth allocated to the set of user devices, and/or the like. In some implementations, the set of user devices may be associated with a set of network devices of the plurality of network devices. The class of service system may receive (e.g., via input) or determine the set of user devices that are subject to the modified class of service, and may identify the set of network devices that correspond to the determined set of user devices. The set of network devices may thus be subject to the modified class of service.

As further shown in FIG. 1A, and by reference number 115, the class of service system may receive telemetry data associated with the plurality of the network devices. For example, since the class of service configuration includes information that causes the plurality of network devices to generate the telemetry data for monitoring live utilization of the network by the plurality of user devices, the plurality of network devices may generate the telemetry data, and may provide the telemetry data to the class of service system. The class of service system may continuously receive the telemetry data from the plurality of the network devices, may periodically receive the telemetry data from the plurality of the network devices, may receive the telemetry data based on requesting the telemetry data from the plurality of the network devices, and/or the like. In some implementations, the telemetry data may include data identifying real-time or near-real-time utilization of the plurality of network devices, data identifying real-time or near-real-time network bandwidth utilization by the plurality of user devices, data identifying real-time or near-real-time throughput of the plurality of user devices, data identifying real-time or near-real-time processing loads of the plurality of user devices, and/or the like.

Figure 1B:
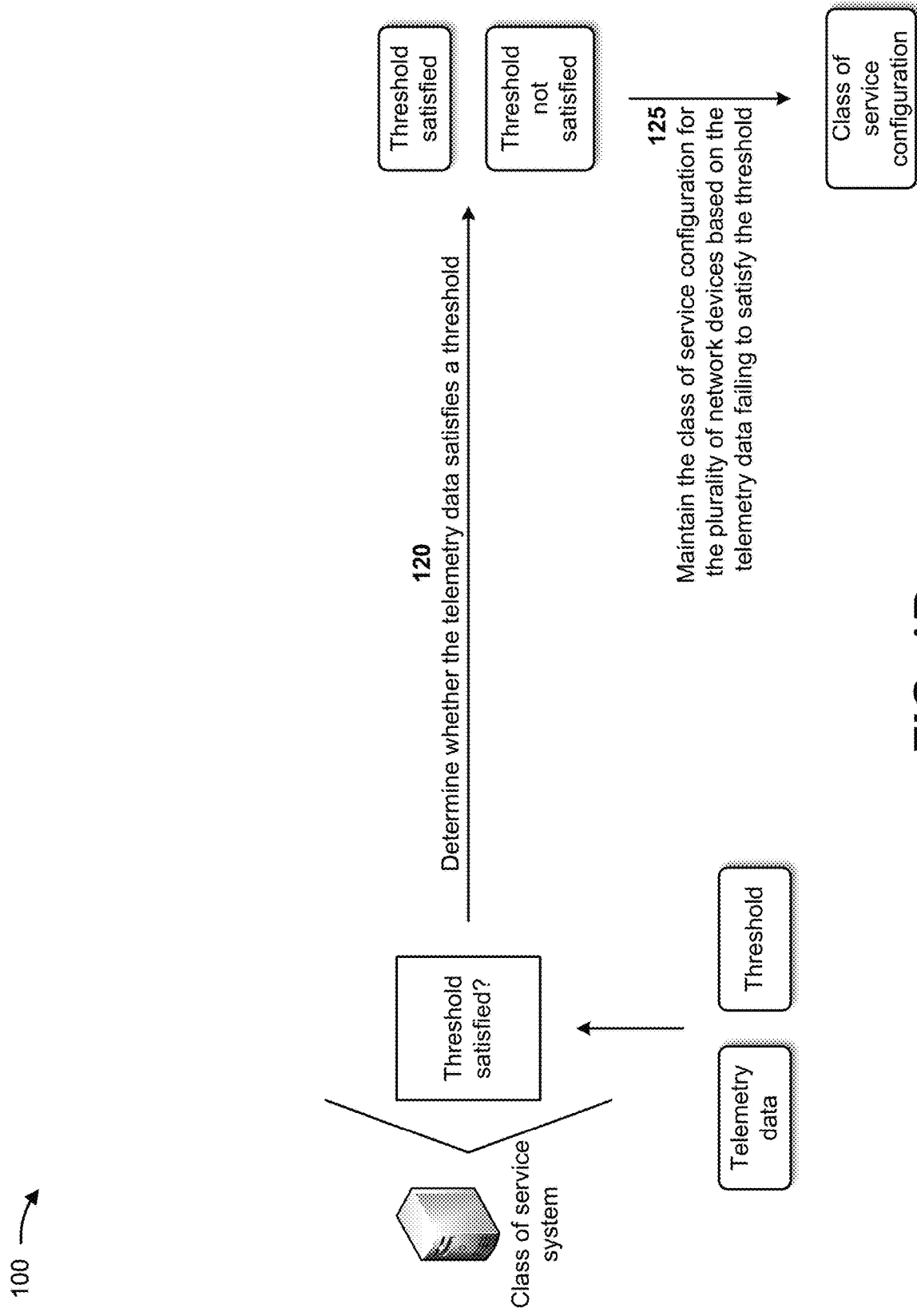

As shown in FIG. 1B, and by reference number 120, the class of service system may determine whether the telemetry data satisfies a threshold. For example, the class of service system may dynamically set the threshold based on the telemetry data utilized by the class of service system. If the telemetry data is associated with bandwidth utilization, the threshold may be associated with bandwidth utilization and may be dynamically set based on an overall bandwidth of the network. If the telemetry data is associated with throughput, the threshold may be associated with throughput and may be dynamically set based on a total throughput of the network. In some implementations, if the threshold is not set based on bandwidth utilization or throughput, the class of service system may allocate a percentage of the overall bandwidth and/or the total throughput to one or more of the user devices (e.g., when there is increased bandwidth and/or throughput usage). In some implementations, the class of service system may determine that the telemetry data satisfies the threshold (e.g., indicating a network event, such as a bandwidth spike, increased throughput utilization, and/or the like). Alternatively, the class of service system may determine that the telemetry data fails to satisfy the threshold (e.g., indicating normal operation of the network).

As further shown in FIG. 1B, and by reference number 125, the class of service system may maintain the class of service configuration for the plurality of network devices based on the telemetry data failing to satisfy the threshold. For example, when the class of service system determines that the telemetry data fails to satisfy the threshold (e.g., indicating normal operation of the network), the class of service system may maintain the class of service configuration for the plurality of network devices since the network is operating under normal conditions. In some implementations, the class of service system may maintain the class of service configuration for the plurality of network devices but not modify the class of service configuration for the plurality of network devices.

Figure 1C:
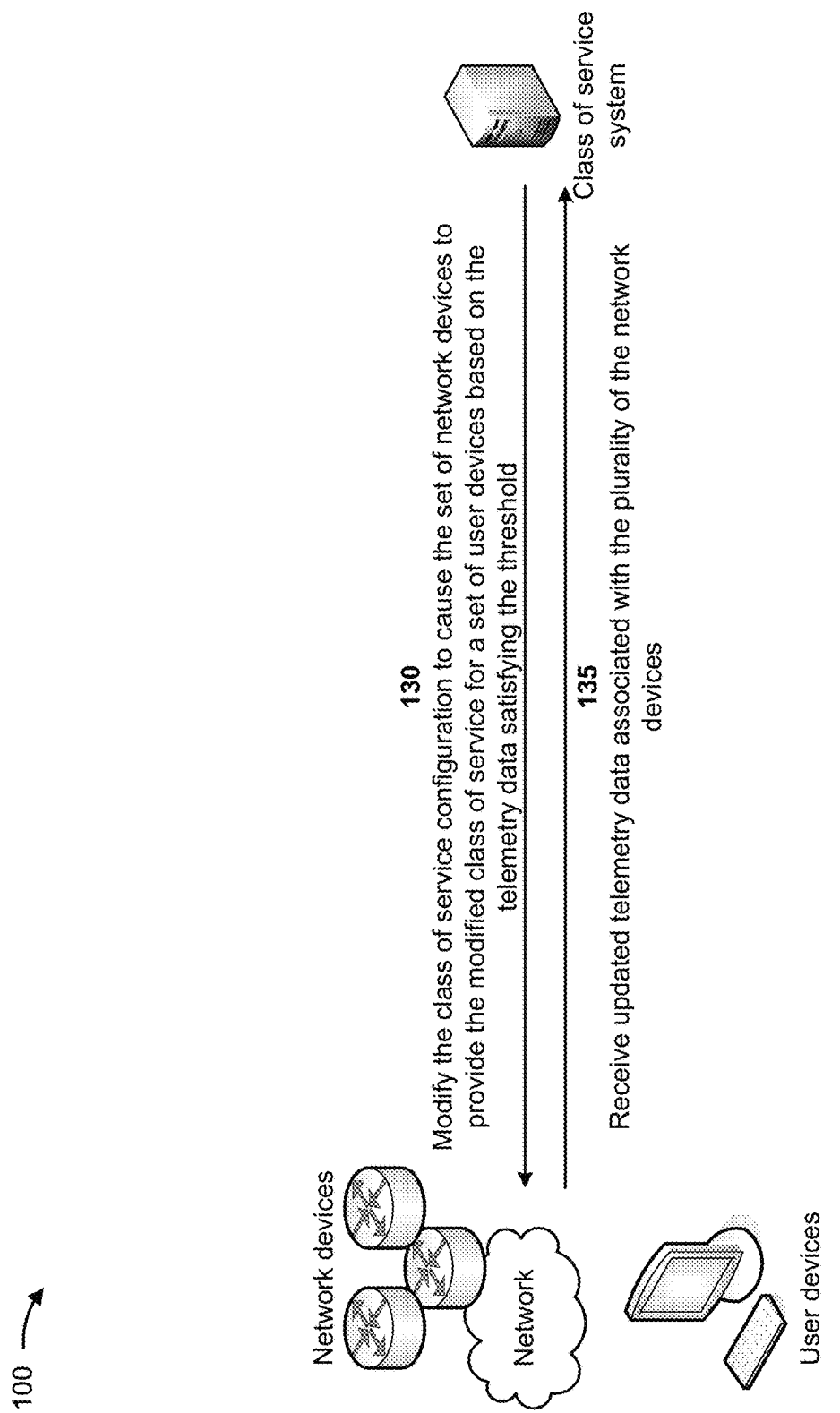

As shown in FIG. 1C, and by reference number 130, the class of service system may modify the class of service configuration to cause the set of network devices to provide the modified class of service for a set of user devices based on the telemetry data satisfying the threshold. For example, when the class of service system determines that the telemetry data satisfies the threshold (e.g., indicating a network event, such as a bandwidth spike, increased throughput utilization, and/or the like), the class of service system may determine that the class of service configuration is to be modified to handle the network event. Based on determining that the class of service configuration is to be modified, the class of service system may modify the class of service configuration to cause the set of network devices to provide the modified class of service for the set of user devices associated with the set of network devices. The class of service system may have a full network view based on the telemetry data, and may dynamically engineer network traffic based on modifying the class of service configuration for the set of network devices. For example, the class of service system may intelligently redirect low profile network traffic along a different route, may provide a best effort service, and/or the like. In this way, the class of service system may prevent network bandwidth overruns and drops, may save time and money for a network provider, and may provide different services for different user devices.

In some implementations, when modifying the class of service configuration, the class of service system may utilize an OpenConfig protocol or a network configuration protocol (NETCONF) to modify the class of service configuration for the set of network devices. In some implementations, when modifying the class of service configuration, the class of service system may activate a flag of the class of service configuration to cause the set of network devices to provide the modified class of service for the set of user devices. In some implementations, when modifying the class of service configuration, the class of service system may modify the class of service configuration for only the set of network devices.

As further shown in FIG. 1C, and by reference number 135, the class of service system may receive updated telemetry data associated with the plurality of the network devices. For example, the class of service system may continue to monitor the telemetry data after modifying the class of service configuration for the set of network devices. The plurality of network devices may generate the updated telemetry data, and may provide the updated telemetry data to the class of service system. The class of service system may continuously receive the updated telemetry data from the plurality of the network devices, may periodically receive the updated telemetry data from the plurality of the network devices, may receive the updated telemetry data based on requesting the updated telemetry data from the plurality of the network devices, and/or the like. In some implementations, the updated telemetry data may include data identifying updated real-time or near-real-time utilization of the plurality of network devices, data identifying updated real-time or near-real-time network bandwidth utilization by the plurality of user devices, data identifying updated real-time or near-real-time throughput of the plurality of user devices, data identifying updated real-time or near-real-time processing loads of the plurality of user devices, and/or the like.

Figure 1D:
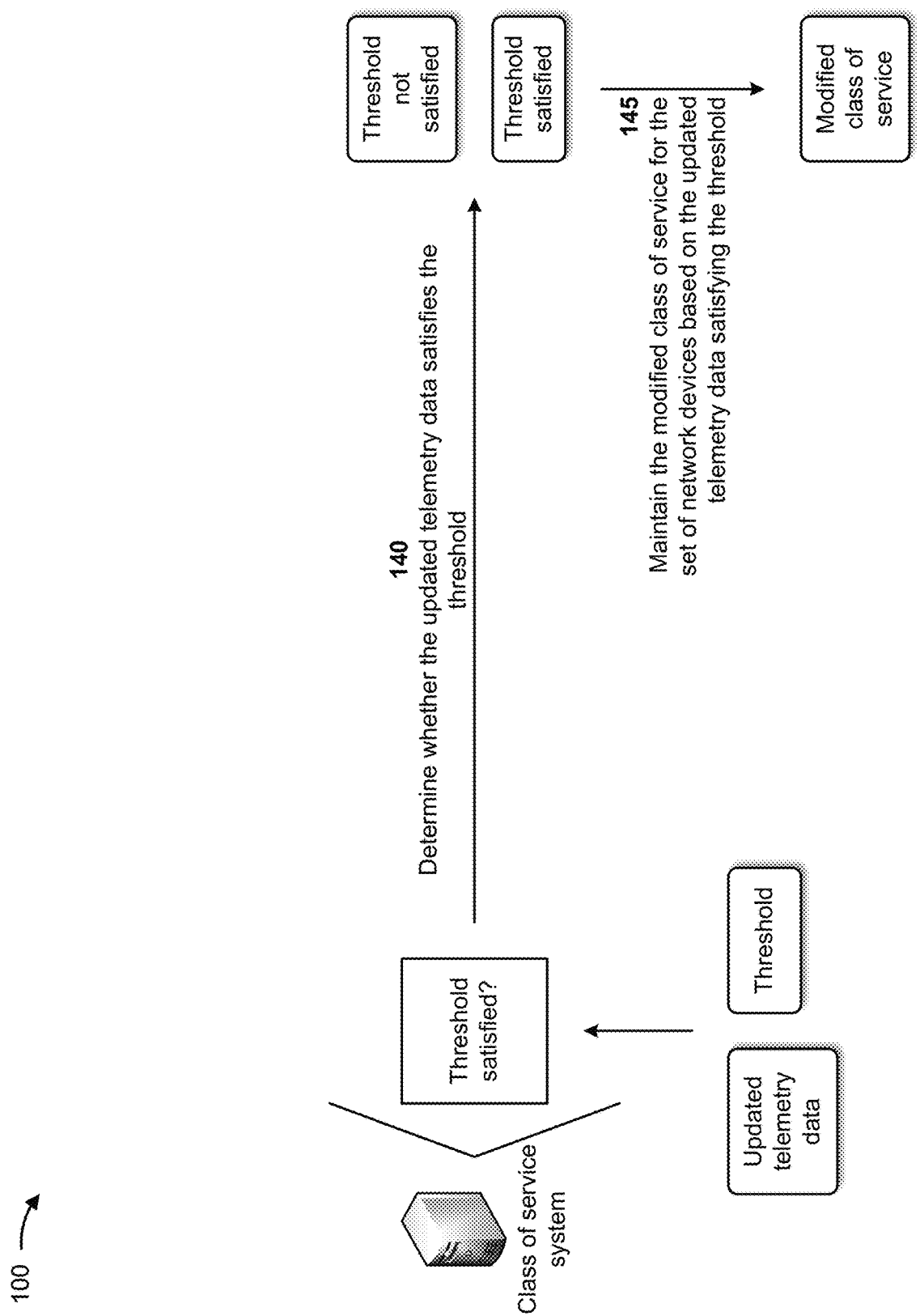

As shown in FIG. 1D, and by reference number 140, the class of service system may determine whether the updated telemetry data satisfies the threshold. For example, the class of service system may determine that the updated telemetry data satisfies the threshold (e.g., indicating continuation of the network event, such as the bandwidth spike, the increased throughput utilization, and/or the like). Alternatively, the class of service system may determine that the updated telemetry data fails to satisfy the threshold (e.g., indicating absence of the network event and indicating normal operation of the network).

As further shown in FIG. 1D, and by reference number 145, the class of service system may maintain the modified class of service for the set of network devices based on the updated telemetry data satisfying the threshold. For example, when the class of service system determines that the updated telemetry data satisfies the threshold (e.g., indicating continuation of the network event, such as the bandwidth spike, the increased throughput utilization, and/or the like), the class of service system may determine that the modified class of service configuration is to be maintained to continue to handle the network event. Based on determining that the modified class of service configuration is to be maintained, the class of service system may maintain the modified class of service configuration to cause the set of network devices to provide the modified class of service for the set of user devices associated with the set of network devices. In some implementations, the class of service system may maintain the modified class of service configuration for the plurality of network devices by not returning the modified class of service configuration to the class of service configuration.

Figure 1E:
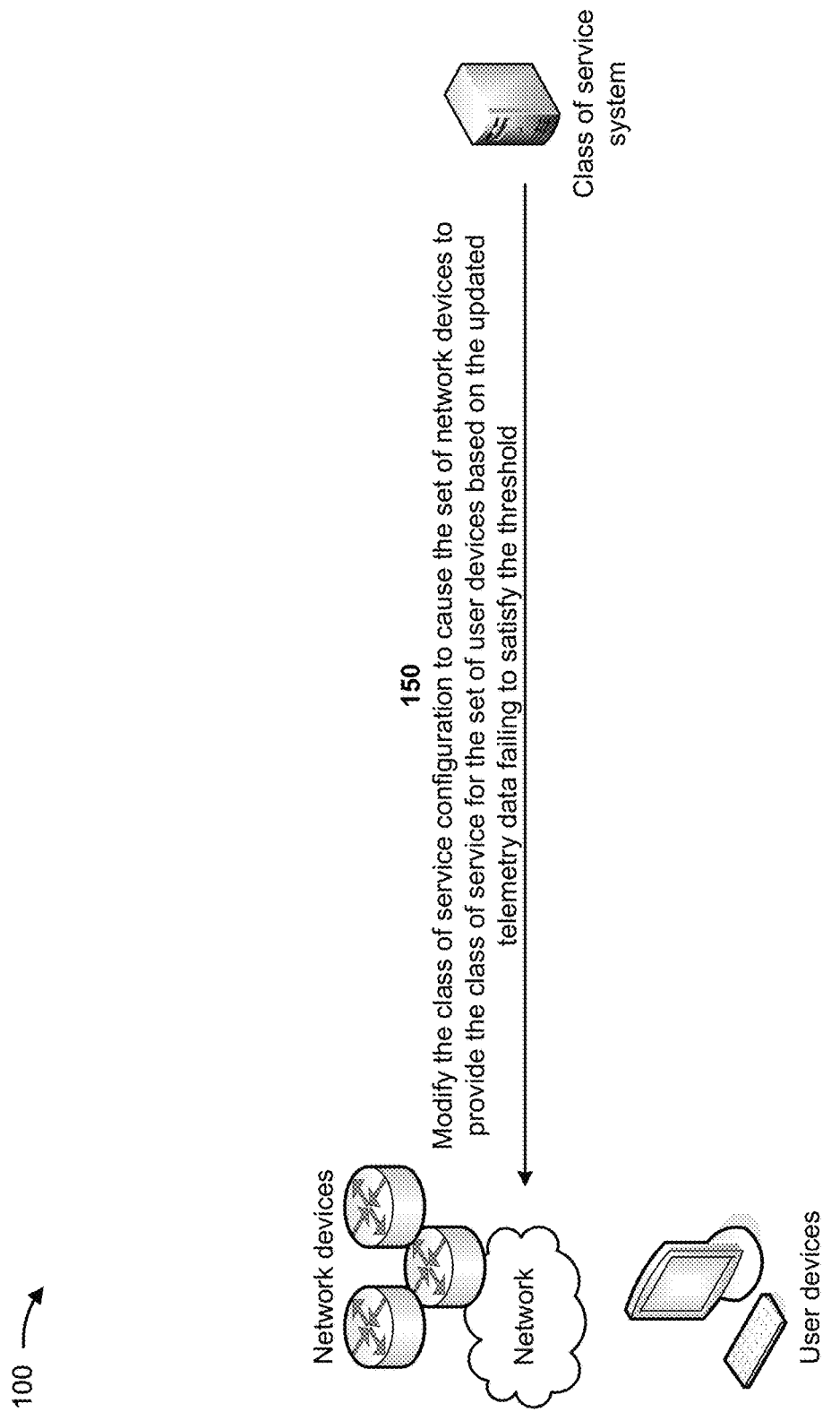

As shown in FIG. 1E, and by reference number 150, the class of service system may modify the class of service configuration to cause the set of network devices to provide the class of service for the set of user devices based on the updated telemetry data failing to satisfy the threshold. For example, when the class of service system determines that the telemetry data fails to satisfy the threshold (e.g., indicating absence of the network event and indicating normal operation of the network), the class of service system may modify the class of service configuration to cause the set of network devices to provide the class of service for the set of user devices. In other words, the class of service system may cause the modified class of service configuration to return to the class of service configuration for the set of network devices. In some implementations, when modifying the class of service configuration, the class of service system may utilize an OpenConfig protocol or a network configuration protocol to cause the modified class of service configuration to return to the class of service configuration for the set of network devices, may deactivate the flag of the class of service configuration that causes the set of network devices to provide the modified class of service for the set of user devices, and/or the like.

Figure 1F:
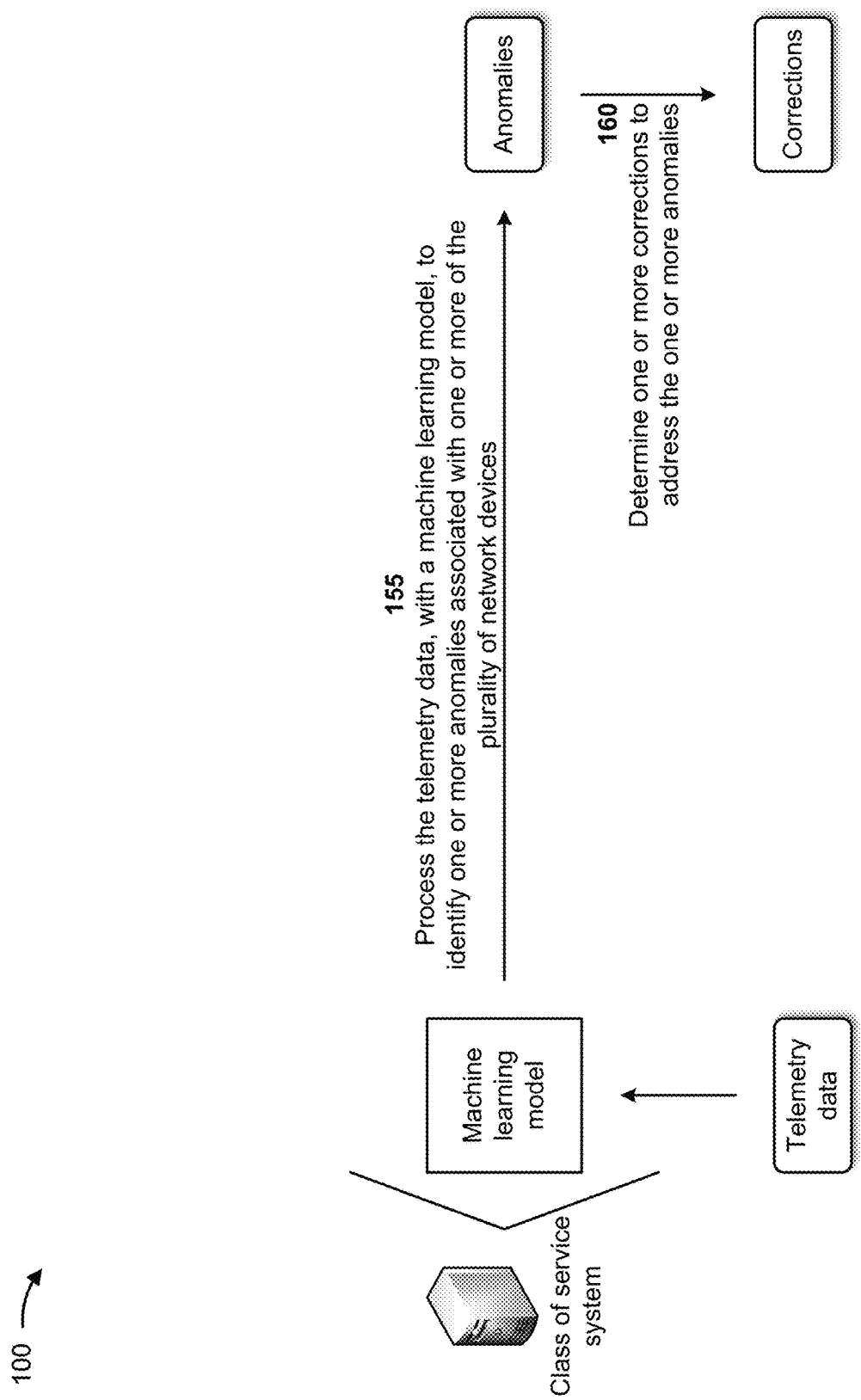

As shown in FIG. 1F, and by reference number 155, the class of service system may process the telemetry data, with a machine learning model, to identify one or more anomalies associated with one or more of the plurality of network devices. For example, the class of service system may be associated with a machine learning model that identifies anomalies in the network (e.g., associated with one or more of the plurality of network devices) based on processing the telemetry data. Further details of training and utilizing a machine learning model are provided below in connection with FIG. 2. In some implementations, the one or more anomalies may include a malfunctioning network device, a network device subject to a security breach (e.g., malware, a virus, a denial-of-service attack, and/or the like), an overloaded network device, a network device violating a class of service, a network device violating a service level agreement, and/or the like.

As further shown in FIG. 1F, and by reference number 160, the class of service system may determine one or more corrections to address the one or more anomalies. For example, depending on the anomaly, the class of service system may identify a correction that addresses the anomaly. If the anomaly is a malfunctioning network device, the correction may include diverting traffic from the malfunctioning network device, powering off and on the malfunctioning network, dispatching an autonomous vehicle or a technician to service the malfunctioning network device, and/or the like. If the anomaly is a security breach, such as malware, the correction may include utilizing software to remove the malware from the network device.

Figure 1G:
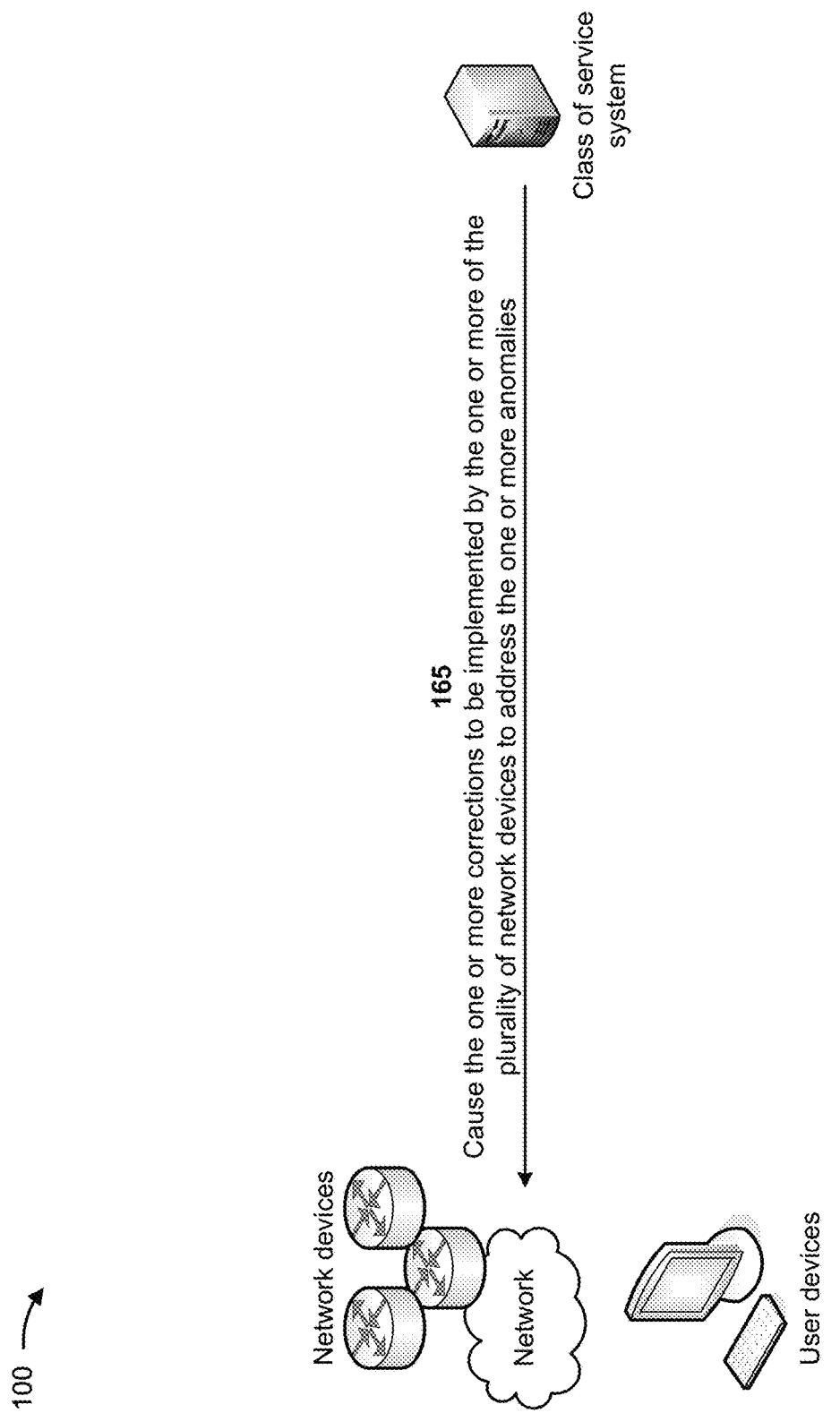

As shown in FIG. 1G, and by reference number 165, the class of service system may cause the one or more corrections to be implemented by the one or more of the plurality of network devices to address the one or more anomalies. For example, the class of service system may eliminate or address the one or more anomalies by causing the one or more of the plurality of network devices to implement the one or more corrections. In one example, the class of service system may cause traffic to be diverted from a malfunctioning network device, may cause the malfunctioning network device to power off and on, may cause an autonomous vehicle or a technician to be dispatched to service the malfunctioning network device, and/or the like.

In this way, the class of service system dynamically programs class of service configurations for network devices. For example, the class of service system may dynamically modify class of service configurations for network devices to handle network events, and may revert the class of service configurations to original configurations once the network events have ceased. The class of service system may utilize telemetry data from the network devices when determining whether to modify class of service configurations for the network devices. The telemetry data may provide the class of service system with network intelligence that the class of service system may utilize to automatically modify the class of service configurations for the network devices without causing a network outage. Thus, the class of service system may conserve computing resources, networking resources, and/or other resources that would have otherwise been consumed by manually changing class of service in network devices, providing a poor user experience until the class of service is changed in network devices, handling lost data caused by failing to quickly change the class of service in network devices, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
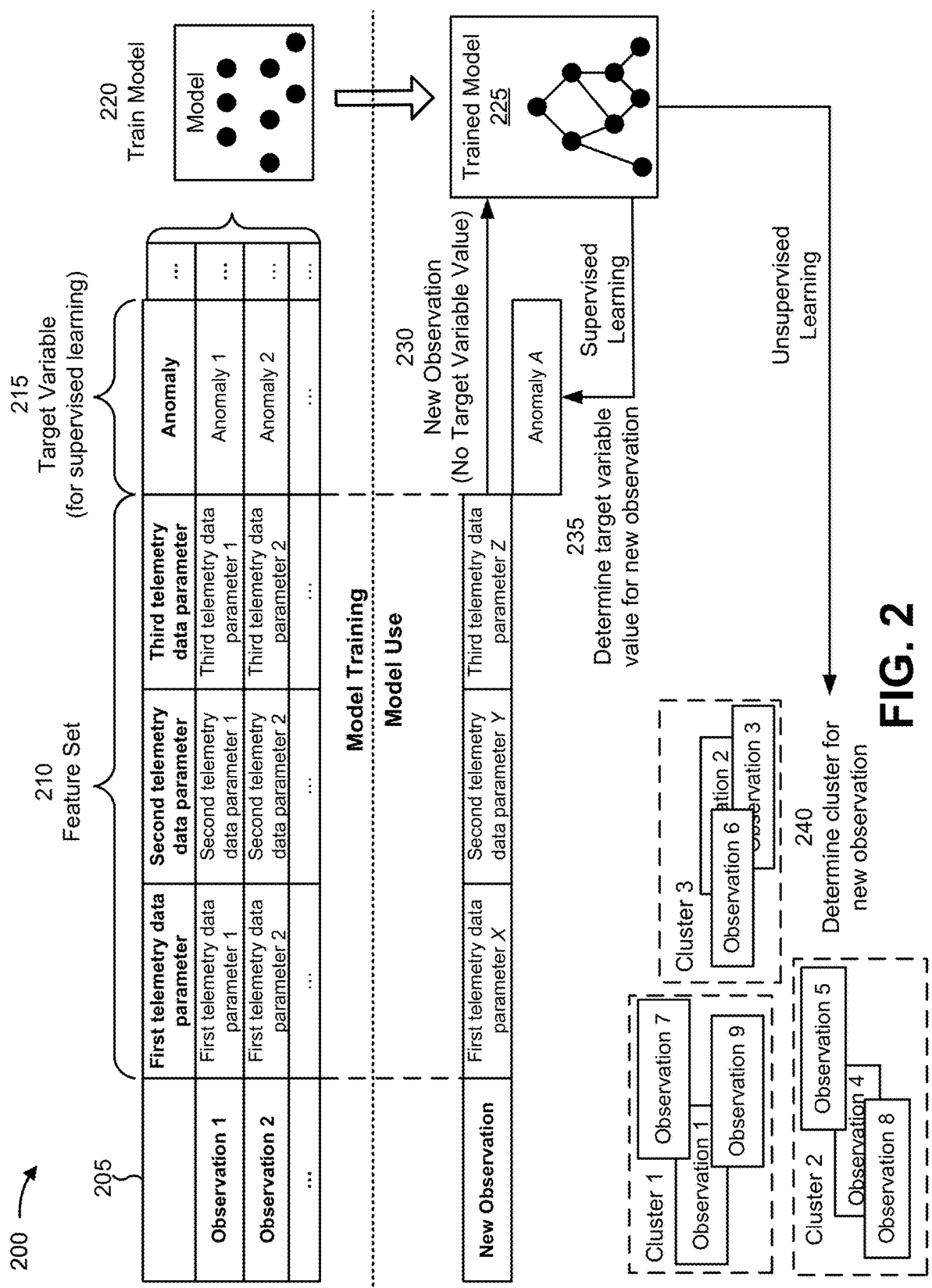
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the class of service system.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the class of service system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the class of service system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first telemetry data parameter, a second feature of second telemetry data parameter, a third feature of third telemetry data parameter, and so on. As shown, for a first observation, the first feature may have a value of first telemetry data parameter 1, the second feature may have a value of second telemetry data parameter 1, the third feature may have a value of third telemetry data parameter 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an anomaly, which has a value of anomaly 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first telemetry data parameter X, a second feature of second telemetry data parameter Y, a third feature of third telemetry data parameter Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of anomaly A for the target variable of anomaly for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first telemetry data parameter cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second telemetry data parameter cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine anomalies associated with telemetry data. The machine learning system may enable recognition and/or identification of tens, hundreds, thousands, or millions of features and/or feature values for tens, hundreds, thousands, or millions of observations, thereby increasing accuracy and consistency and reducing delay associated with determining anomalies associated with telemetry data relative to requiring computing resources to be allocated for tens, hundreds, or thousands of operators to manually determine anomalies associated with telemetry data.

As indicated above, FIG. 2 is provided as an example. Other examples may differ from what is described in connection with FIG. 2.

Figure 3:
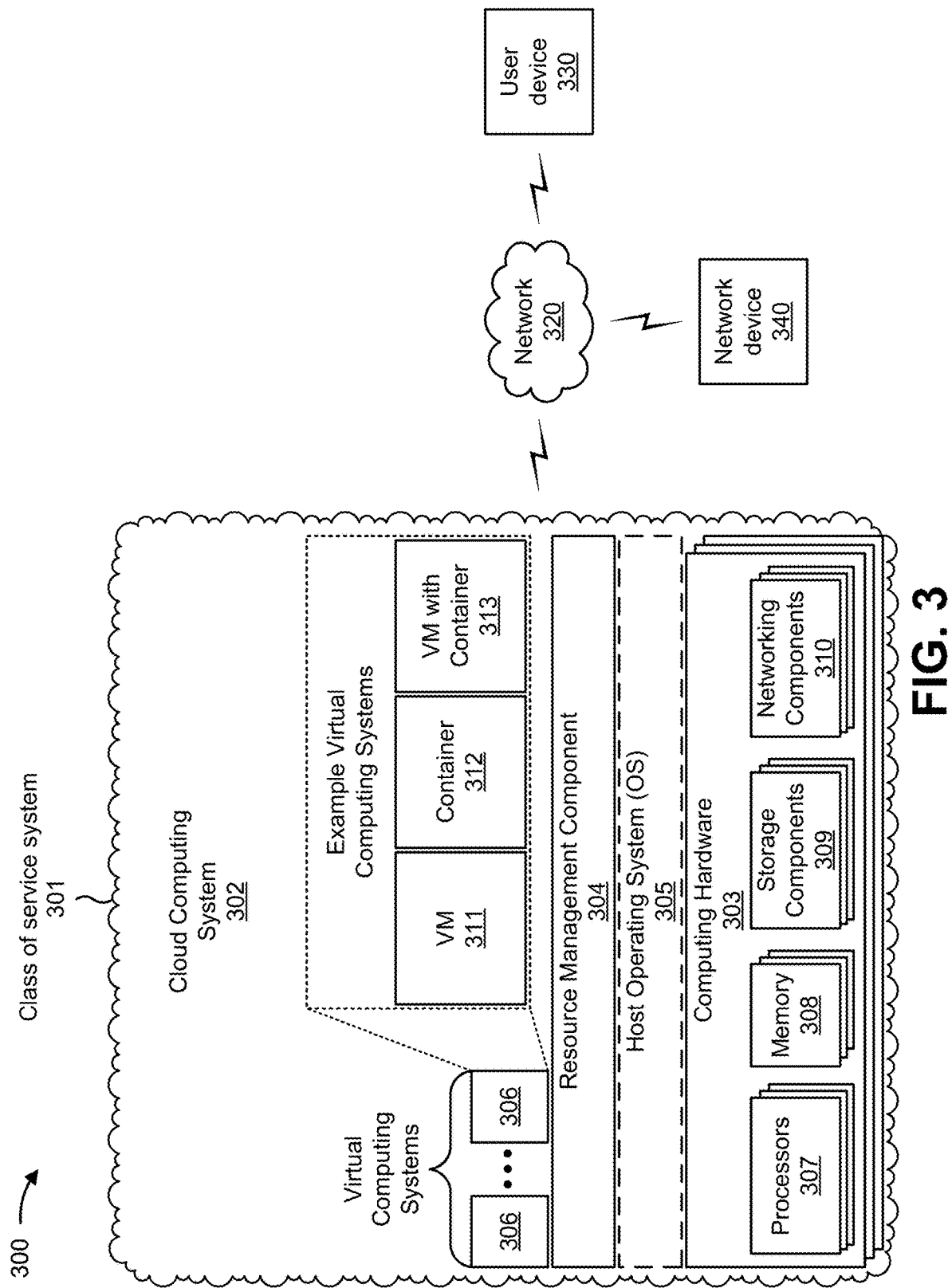
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include class of service system 301, which may include one or more elements of and/or may execute within a cloud computing system 302. The cloud computing system 302 may include one or more elements 303-313, as described in more detail below. As further shown in FIG. 3, the environment 300 may include a network 320, a user device 330, and/or a network device 340. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the class of service system 301 may include one or more elements 303-313 of the cloud computing system 302, may execute within the cloud computing system 302, and/or may be hosted within the cloud computing system 302, in some implementations, the class of service system 301 may not be cloud-based (e.g., may be implemented outside of a cloud computing system) or may be partially cloud-based. For example, the class of service system 301 may include one or more devices that are not part of the cloud computing system 302, such as a device 400 of FIG. 4, which may include a standalone server or another type of computing device. The class of service system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 340 may include one or more devices capable of receiving, processing, storing, routing, and/or providing traffic (e.g., a packet and/or other information or metadata) in a manner described herein. For example, the network device 340 may include a router, such as a label switching router (LSR), a label edge router (LER), an ingress router, an egress router, a provider router (e.g., a provider edge router or a provider core router), a virtual router, or another type of router. Additionally, or alternatively, the network device 340 may include a gateway, a switch, a firewall, a hub, a bridge, a reverse proxy, a server (e.g., a proxy server, a cloud server, or a data center server), a load balancer, and/or a similar device. In some implementations, the network device 340 may be a physical device implemented within a housing, such as a chassis. In some implementations, the network device 340 may be a virtual device implemented by one or more computing devices of a cloud computing environment or a data center. In some implementations, a group of network devices 340 may be a group of data center nodes that are used to route traffic flow through a network.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
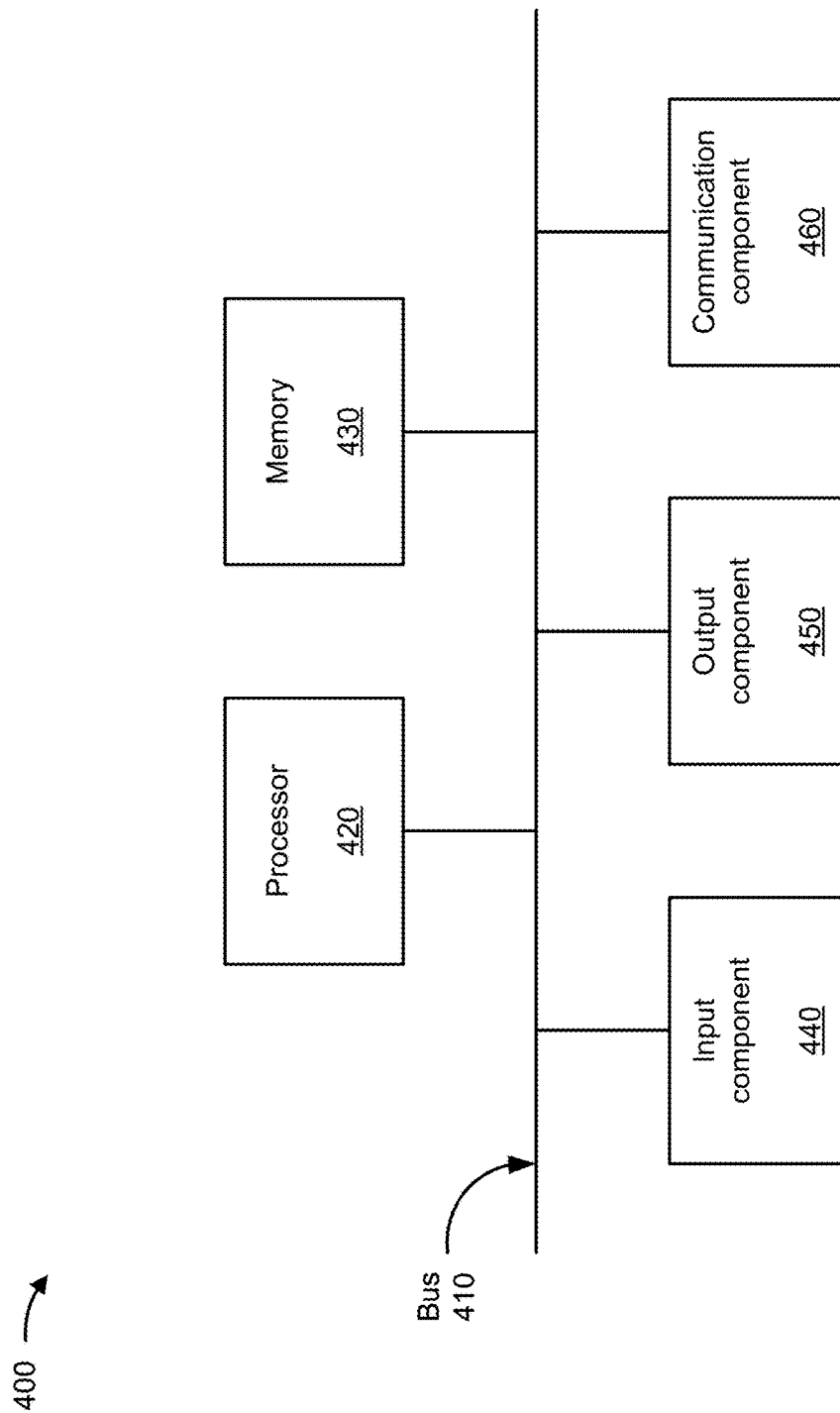
FIG. 4 is a diagram of example components of one or more devices of FIG. 3.

FIG. 4 is a diagram of example components of a device 400, which may correspond to the class of service system 301, the user device 330, and/or the network device 340. In some implementations, the class of service system 301, the user device 330, and/or the network device 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
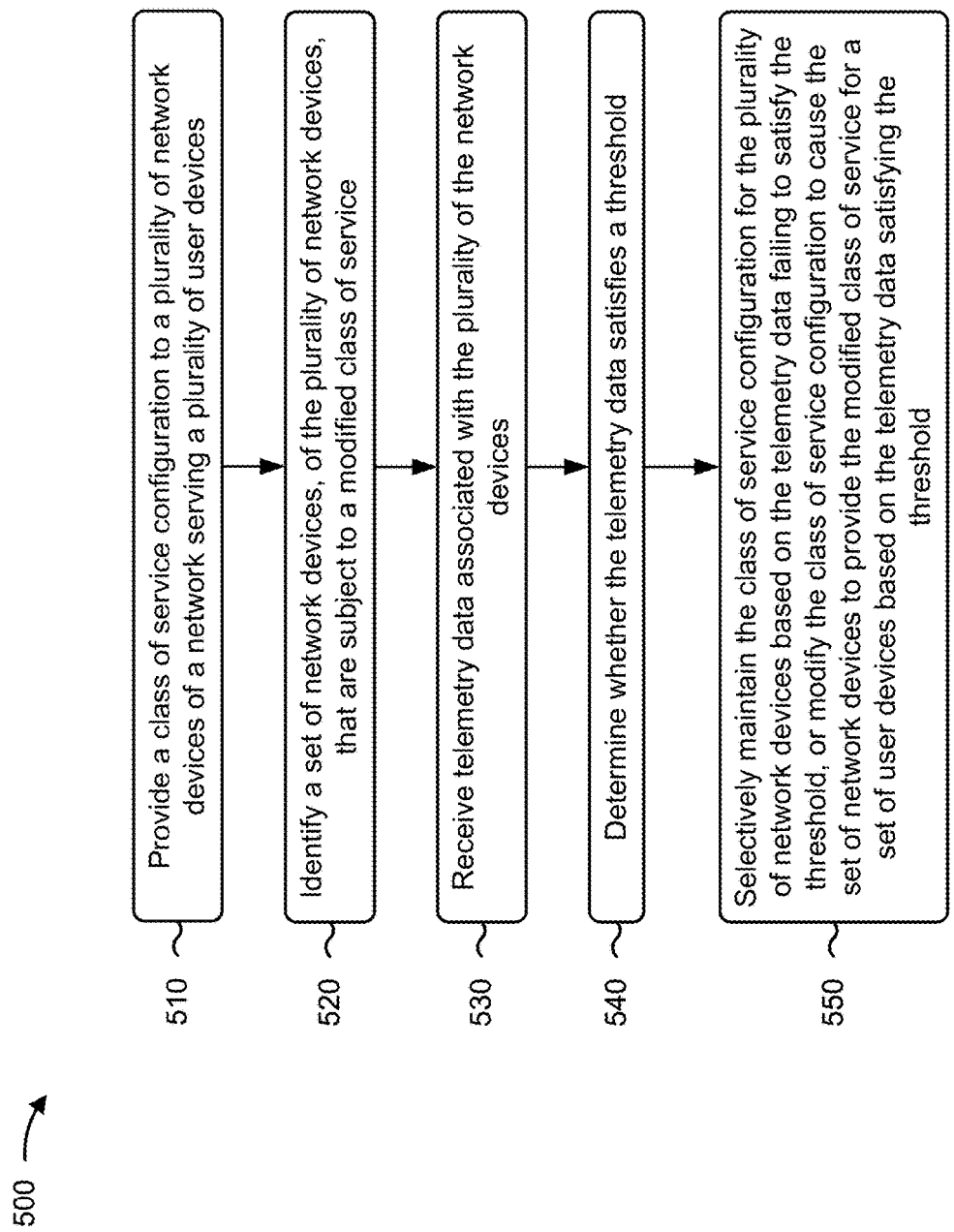
FIG. 5 is a flowchart of an example process for dynamically programming class of service configurations for network devices.

FIG. 5 depicts a flowchart of an example process 500 for dynamically programming class of service configurations for network devices. In some implementations, one or more process blocks of FIG. 5 may be performed by a device (e.g., the class of service system 301). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include providing a class of service configuration to a plurality of network devices of a network serving a plurality of user devices (block 510). For example, the device may provide a class of service configuration to a plurality of network devices of a network serving a plurality of user devices, as described above. In some implementations, providing the class of service configuration to the plurality of network devices includes utilizing an OpenConfig protocol or a network configuration protocol to provide the class of service configuration to the plurality of network devices.

As further shown in FIG. 5, process 500 may include identifying a set of network devices, of the plurality of network devices, that are subject to a modified class of service (block 520). For example, the device may identify a set of network devices, of the plurality of network devices, that are subject to a modified class of service, as described above. In some implementations, the modified class of service for the set of user devices includes one or more of redirecting low priority traffic associated with the set of user devices, providing a best effort service for the set of user devices, or providing a priority service for the plurality of user devices other than the set of user devices.

As further shown in FIG. 5, process 500 may include receiving telemetry data associated with the plurality of the network devices (block 530). For example, the device may receive telemetry data associated with the plurality of the network devices, as described above. In some implementations, the telemetry data includes data identifying real-time or near-real-time utilization of the plurality of network devices. In some implementations, the telemetry data includes data identifying real-time or near-real-time network bandwidth utilization by the plurality of user devices.

As further shown in FIG. 5, process 500 may include determining whether the telemetry data satisfies a threshold (block 540). For example, the device may determine whether the telemetry data satisfies a threshold, as described above. In some implementations, the threshold is dynamically determined based on bandwidth usage of the network by the plurality of user devices.

As further shown in FIG. 5, process 500 may include selectively maintaining the class of service configuration for the plurality of network devices based on the telemetry data failing to satisfy the threshold, or modifying the class of service configuration to cause the set of network devices to provide the modified class of service for a set of user devices based on the telemetry data satisfying the threshold (block 550). For example, the device may selectively maintain the class of service configuration for the plurality of network devices based on the telemetry data failing to satisfy the threshold, or modify the class of service configuration to cause the set of network devices to provide the modified class of service for a set of user devices based on the telemetry data satisfying the threshold, as described above.

In some implementations, modifying the class of service configuration includes utilizing an OpenConfig protocol or a network configuration protocol to modify the class of service configuration for the set of network devices. In some implementations, modifying the class of service configuration includes activating a flag of the class of service configuration to cause the set of network devices to provide the modified class of service for the set of user devices. In some implementations, modifying the class of service configuration includes modifying the class of service configuration for only the set of network devices.

In some implementations, process 500 includes receiving updated telemetry data associated with the plurality of the network devices; determining whether the updated telemetry data satisfies the threshold; and selectively maintaining the modified class of service for the set of network devices based on the updated telemetry data satisfying the threshold, or modifying the class of service configuration to cause the set of network devices to provide the class of service for the set of user devices based on the updated telemetry data failing to satisfy the threshold. In some implementations, modifying the class of service configuration for the set of network devices based on the updated telemetry data satisfying the threshold includes utilizing an OpenConfig protocol or a network configuration protocol to modify the class of service configuration for the set of network devices.

In some implementations, process 500 includes processing the telemetry data, with a machine learning model, to identify one or more anomalies associated with one or more of the plurality of network devices, and determining one or more corrections to address the one or more anomalies. In some implementations, process 500 includes causing the one or more corrections to be implemented by the one or more of the plurality of network devices to address the one or more anomalies.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
providing, by a device, a class of service configuration to a plurality of network devices of a network serving a plurality of user devices;
identifying, by the device, a set of network devices, of the plurality of network devices,
that are subject to a modified class of service;
receiving, by the device, telemetry data associated with the plurality of the network devices;
determining, by the device, whether the telemetry data satisfies a threshold; and selectively:
maintaining, by the device, the class of service configuration for the plurality of network devices based on the telemetry data failing to satisfy the threshold; or
modifying, by the device, the class of service configuration to cause the set of network devices to provide the modified class of service for a set of user devices based on the telemetry data satisfying the threshold, wherein modifying the class of service configuration comprises:
utilizing an OpenConfig protocol or a network configuration protocol to modify the class of service configuration for the set of network devices.

2. The method of claim 1, further comprising:
receiving updated telemetry data associated with the plurality of the network devices;
determining whether the updated telemetry data satisfies the threshold; and
selectively:
maintaining the modified class of service for the set of network devices based on the updated telemetry data satisfying the threshold; or
modifying the class of service configuration to cause the set of network devices to provide the class of service for the set of user devices based on the updated telemetry data failing to satisfy the threshold.

3. The method of claim 1, further comprising:
processing the telemetry data, with a machine learning model, to identify one or more anomalies associated with one or more of the plurality of network devices; and
determining one or more corrections to address the one or more anomalies.

4. The method of claim 3, further comprising:
causing the one or more corrections to be implemented by the one or more of the plurality of network devices to address the one or more anomalies.

5. The method of claim 1, wherein the telemetry data includes data identifying real-time or near-real-time utilization of the plurality of network devices.

6. The method of claim 1, wherein the telemetry data includes data identifying real-time or near-real-time network bandwidth utilization by the plurality of user devices.

7. The method of claim 1, wherein one or more anomalies are determined based on processing the telemetry data, and wherein the one or more anomalies are associated with at least one of:
a malfunctioning device, or
a security breach.

8. A device, comprising:
one or more memories; and
one or more processors to:
provide a class of service configuration to a plurality of network devices of a network serving a plurality of user devices;
identify a set of network devices, of the plurality of network devices, that are subject to a modified class of service;
receive telemetry data associated with the plurality of the network devices,
wherein the telemetry data includes data identifying real-time or near-real-time utilization of the plurality of network devices;
determine whether the telemetry data satisfies a threshold; and
selectively:
maintain the class of service configuration for the plurality of network devices based on the telemetry data failing to satisfy the threshold; or
modify the class of service configuration to cause the set of network devices to provide the modified class of service for a set of user devices based on the telemetry data satisfying the threshold,
wherein the one or more processors, to modify the class of service configuration, are to:
utilize an OpenConfig protocol or a network configuration protocol to modify the class of service configuration for the set of network devices.

9. The device of claim 8, wherein the threshold is dynamically determined based on bandwidth usage of the network by the plurality of user devices.

10. The device of claim 8, wherein the modified class of service for the set of user devices includes one or more of:
redirect low priority traffic associated with the set of user devices,
provide a best effort service for the set of user devices, or
provide a priority service for the plurality of user devices other than the set of user devices.

11. The device of claim 8, wherein the one or more processors, to provide the class of service configuration to the plurality of network devices, are to:
utilize the OpenConfig protocol or a network configuration protocol to provide the class of service configuration to the plurality of network devices.

12. The device of claim 8, wherein the one or more processors, to modify the class of service configuration, are to:
activate a flag of the class of service configuration to cause the set of network devices to provide the modified class of service for the set of user devices.

13. The device of claim 8, wherein the one or more processors, to modify the class of service configuration, are to:
modify the class of service configuration for only the set of network devices.

14. The device of claim 8, wherein one or more anomalies are determined based on processing the telemetry data, and wherein the one or more anomalies are associated with at least one of:
a malfunctioning device, or
a security breach.

15. A non-transitory computer-readable medium storing a set of instructions, the set of instructions comprising:
one or more instructions that, when executed by one or more processors of a device, cause the device to:
provide a class of service configuration to a plurality of network devices of a network serving a plurality of user devices;
identify a set of network devices, of the plurality of network devices, that are subject to a modified class of service;
receive telemetry data associated with the plurality of the network devices,
wherein the telemetry data includes data identifying real-time or near-real-time network bandwidth utilization by the plurality of user devices;
determine whether the telemetry data satisfies a threshold; and selectively:
  maintain the class of service configuration for the plurality of network devices based on the telemetry data failing to satisfy the threshold; or
  modify the class of service configuration to cause the set of network devices to provide the modified class of service for a set of user devices based on the telemetry data satisfying the threshold,
    wherein the one or more instructions, that cause the device to modify the class of service configuration, cause the device to:
      utilize an OpenConfig protocol or a network configuration protocol to modify the class of service configuration for the set of network devices.

16. The non-transitory computer-readable medium of claim 15, wherein the one or more instructions further cause the device to:
  receive updated telemetry data associated with the plurality of the network devices;
  determine whether the updated telemetry data satisfies the threshold; and
  selectively:
    maintain the modified class of service for the set of network devices based on the updated telemetry data satisfying the threshold; or
    modify the class of service configuration to cause the set of network devices to provide the class of service for the set of user devices based on the updated telemetry data failing to satisfy the threshold.

17. The non-transitory computer-readable medium of claim 15, wherein the one or more instructions further cause the device to:
  process the telemetry data, with a machine learning model, to identify one or more anomalies associated with one or more of the plurality of network devices; and
  determine one or more corrections to address the one or more anomalies.

18. The non-transitory computer-readable medium of claim 17, wherein the one or more instructions further cause the device to:
  cause the one or more corrections to be implemented by the one or more of the plurality of network devices to address the one or more anomalies.

19. The non-transitory computer-readable medium of claim 15, wherein the threshold is dynamically determined based on bandwidth usage of the network by the plurality of user devices.

20. The non-transitory computer-readable medium of claim 15, wherein one or more anomalies are determined based on processing the telemetry data, and
  wherein the one or more anomalies are associated with at least one of:
    a malfunctioning device, or
    a security breach.

* * * * *